United States Patent [19]
Kawasaki

[11] Patent Number: 4,982,978
[45] Date of Patent: Jan. 8, 1991

[54] REAR SUSPENSION SYSTEM

[75] Inventor: Akira Kawasaki, Zama, Japan

[73] Assignee: Nissan Motor Co., Ltd., Yokohama, Japan

[21] Appl. No.: 377,447

[22] Filed: Jul. 10, 1989

[30] Foreign Application Priority Data

Jul. 11, 1988 [JP] Japan .................. 63-173126
Jul. 11, 1988 [JP] Japan .................. 63-173127

[51] Int. Cl.⁵ .............................................. B60G 7/00
[52] U.S. Cl. .................................... 280/675; 280/701; 280/719; 280/726
[58] Field of Search ............... 280/660, 661, 673, 675, 280/701, 724, 725, 726, 719

[56] References Cited

U.S. PATENT DOCUMENTS

| 4,529,223 | 7/1985 | Maebayashi et al. | 280/701 |
| 4,706,989 | 11/1987 | Iijima et al. | 280/701 |
| 4,753,455 | 6/1988 | Murakami et al. | 280/675 |

FOREIGN PATENT DOCUMENTS

| 83182 | 7/1983 | European Pat. Off. . |
| 265959 | 5/1988 | European Pat. Off. . |
| 295661 | 12/1988 | European Pat. Off. . |
| 318753 | 6/1989 | European Pat. Off. . |
| 3821414 | 1/1989 | Fed. Rep. of Germany . |
| 62-247913 | 10/1987 | Japan . |
| 972121 | 10/1964 | United Kingdom . |
| 1224196 | 3/1971 | United Kingdom . |
| 2089742 | 6/1982 | United Kingdom . |

Primary Examiner—Kenneth R. Rice
Attorney, Agent, or Firm—Foley & Lardner, Schwartz, Jeffery, Schwaab, Mack, Blumenthal & Evans

[57] ABSTRACT

A rear suspension system comprises an A-shaped control arm supporting a rear wheel at a first point and a lateral rod supporting the rear wheel at a second point and supported on a vehicle body at a third point. The control arm is supported on a vehicle body in such a way as to be capable of pivoting about an axis and movable a little along the axis of pivoting. The control arm and lateral rod are constructed and arranged so that the second point is located more laterally outward of the vehicle body than the first point and that the second point is located more forward of the vehicle body than the third point.

12 Claims, 6 Drawing Sheets

FRONT END OF VEHICLE BODY

FRONT END OF
VEHICLE BODY

FIG. 6 *(PRIOR ART)*
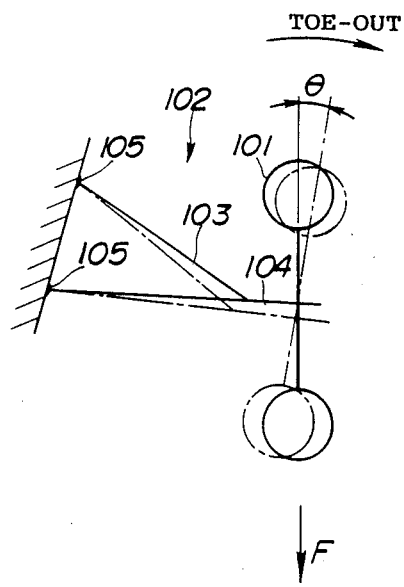

REAR SUSPENSION SYSTEM

BACKGROUND OF THE INVENTION

1. Field of the Invention

The present invention relates to a rear suspension system, particularly of the type capable of maintaining a good running stability of a vehicle even when the rear wheels are subjected to longitudinal forces, i.e., the forces directed longitudinally of the vehicle body.

2. Description of the Prior Art

An example of a prior art rear suspension system is disclosed in Japanese Utility Model Provisional Publication No. 55-1556 and also shown in FIG. 6.

In FIG. 6, a rear wheel is indicated by 101 and supported on a vehicle body by a rear suspension system 102. The rear suspension system 102 includes an A-shaped control arm 103 which is connected to the vehicle body by way of resilient bushings 105. Indicated by the numeral 104 is a rear axle shaft.

The prior art rear suspension system encounters a problem that, when the rear wheel 101 is subjected to a longitudinal force "F" upon acceleration or deceleration, the resilient bushings 105 resiliently deforms to allow the various portions of the rear suspension system 102 to displace as indicated by the chain lines, thus causing the rear wheel 101 to be steered an angle $\theta$ in the toe-out direction and making the running of the vehicle unstable.

SUMMARY OF THE INVENTION

In accordance with the present invention, there is provided a novel rear suspension system which comprises an A-shaped control arm for supporting a rear wheel at a first point, and a lateral rod supporting the rear wheel at a second point and supported on a vehicle body at a third point. The control arm and lateral rod are constructed and arranged so that the second point is located more laterally outward of the vehicle body than the first point and that the second point is located more forward of the vehicle body than the third point.

The above structure is effective for solving the above noted problem inherent in the prior art device.

It is accordingly an object of the present invention to provide a novel rear suspension system which can attain a stable running of a vehicle when the rear wheels are subjected to lingitudinal forces upon rapid acceleration or deceleration.

It is another object of the present invention to provide a novel rear suspension system which is desirable from a safety driving point of view.

It is a further object of the present invention to provide a novel rear suspension system which is suited for attaining a flat rear floor of a vehicle body.

It is a further object of the present invention to provide a novel rear suspension system which can reduce the unsprung weight of the vehicle.

It is a further object of the present invention to provide a novel rear suspension system which can reduce the number of constituent parts and the cost.

BRIEF DESCRIPTION OF THE DRAWINGS

FIG. 6 is a schematic view of a prior art rear suspension system.

DESCRIPTION OF THE PREFERRED EMBODIMENT

Figure 1:
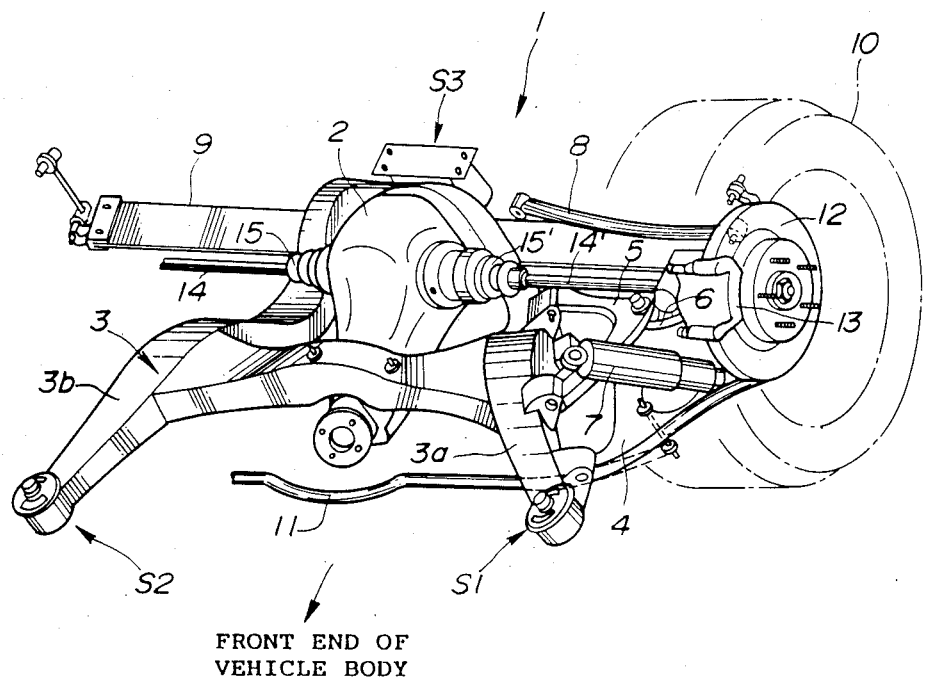
FIG. 1 is a perspective view of a rear suspension system according to an embodiment of the present invention.
Figure 2:
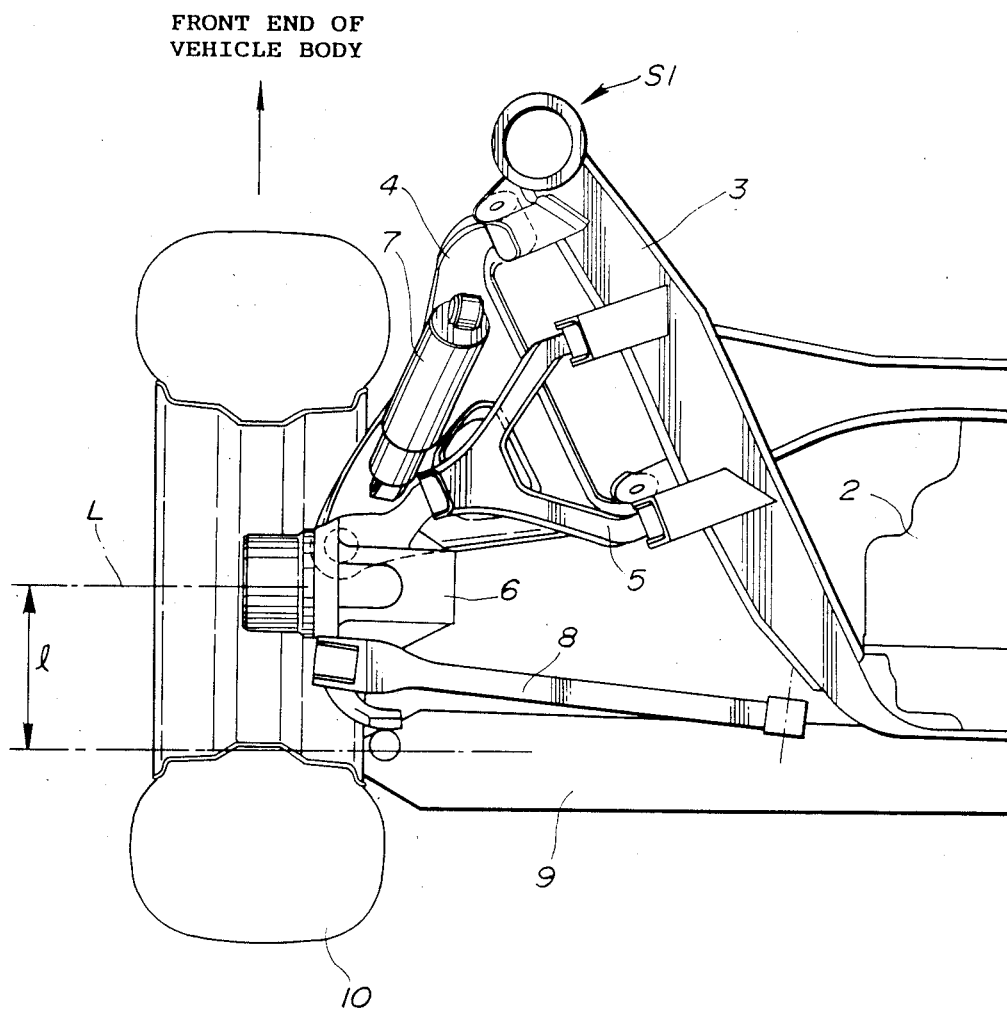
FIG. 2 is a top plan view of a left-hand half (when viewed from the rear of the vehicle) of the rear suspension system of FIG. 1.
Figure 3:
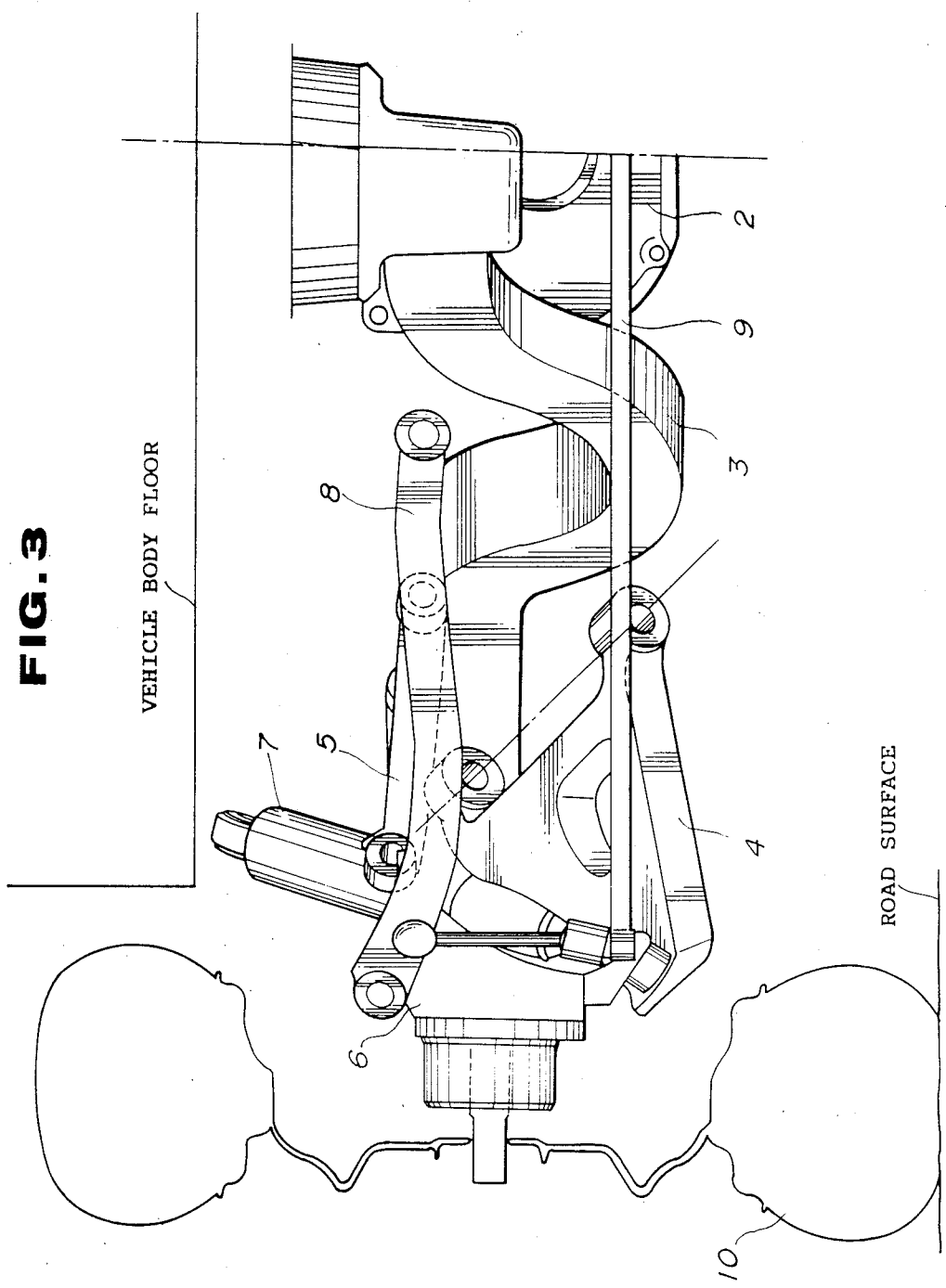
FIG. 3 is a rear elevational view of the left-hand half of the rear suspension system of FIG. 2.

Referring to FIGS. 1–4, a rear suspension system 1 according to an embodiment of the present invention is resiliently supported at three points, i.e., at S1, S2 on the front side and at S3 on the rear side, on a vehicle body 16.

The rear suspension system 1, though generally left-hand half when viewed from the rear of the vehicle is shown, includes an A-shaped suspension member 3 supporting thereon a differential casing 2 and having a pair of frame sections 3a, 3b joined at the rear ends and separated increasingly away from each other toward the front ends. The A-shaped suspension member 3 is resiliently supported on the vehicle body 16 at a common rear end and separated front ends of the frame sections 3a, 3b by way of resilient bushings 3c. The suspension member 3 has at the rear and front ends of the frame sections 3a, 3b the above described points S3, S1, S2, respectively.

The rear suspension system 1 further includes a pair of A-shaped lower control arms 4 each having an outer pivot end and two inner pivot ends and pivotally supported at the inner pivot ends on the respective frame sections 3a, 3b of the suspension member 3. In this connection, the axes about which the inner pivot ends of the A-shaped lower control arm 4 pivots coincide with a common straight line, i.e., the axes of pivotting of the inner pivot ends consitute part of a single straight line. The lower control arm 4 is pivotally supported on the respective frame sections 3a, 3b of the suspension member 3 in such a way as to be movable a little in the direction of the common axis of pivotting of the inner pviot ends.

The rear suspension system 1 yet further includes a pair of V-shaped upper control arms 5 each having an outer pivot end and two inner pivot ends and pivotally supported at the inner pivot ends on the respective frame sections 3a, 3b of the suspension member 3. Similarly to the lower control arm 4, the axes of pivotting of the inner pivot ends of the upper control arm 5 coincident with a common straight line or constitue part of a single straight line. The upper control arm 4 is pivotally supported on the respective frame sections 3a, 3b of the suspension member 3 in such a way as to be movable a little in the direction of the common axis of pivotting of the inner pivot ends. When viewed in a plan view, the axis of the inner pivot ends of upper control arm 5 conincides with that of the inner pivot ends of the lower control arm 4.

The rear suspension system 1 yet further includes a pair of axle housings 6 pivotally connected to the outer pivot ends of the lower control arms 4 and upper control arms 5, a pair of shock absorbers 7 disposed between the respective axle housings 6 and the vehicle body 16 and arranged so as to incline forwardly and upwardly while at the same time laterally inwardly and upwardly, and a pair of lateral rods 8 interconnecting the respective axle housings 6 and the vehicle body 16 and extending nearly horizontally. The lateral rods 8 are disposed more rearward of the vehicle body 16 than the upper and lower control arms 5, 4.

The rear suspension system 1 yet further includes a reaf spring (e.g., a glass fiber reinforced plastic spring) arranged transversely of the vehicle body 16. The leaf spring 9 is supported at a substantially central portion on the vehicle body 16 by way of the suspension member 3 and supports at the opposite ends the axle housings 6. More specifically, the leaf spring 9 is arranged so as to offset, by the distance l, rearward from the line "L" coincident with the axes of rotation of rear wheels 10. The rear wheels 10 are carried on the respective axle housings 6.

In the meantime, 11 is a stabilizer, 12 is a brake disk, 13 is a brake caliper, 14, 14' are axle shafts, and 15, 15' are dust boots.

Figure 5:
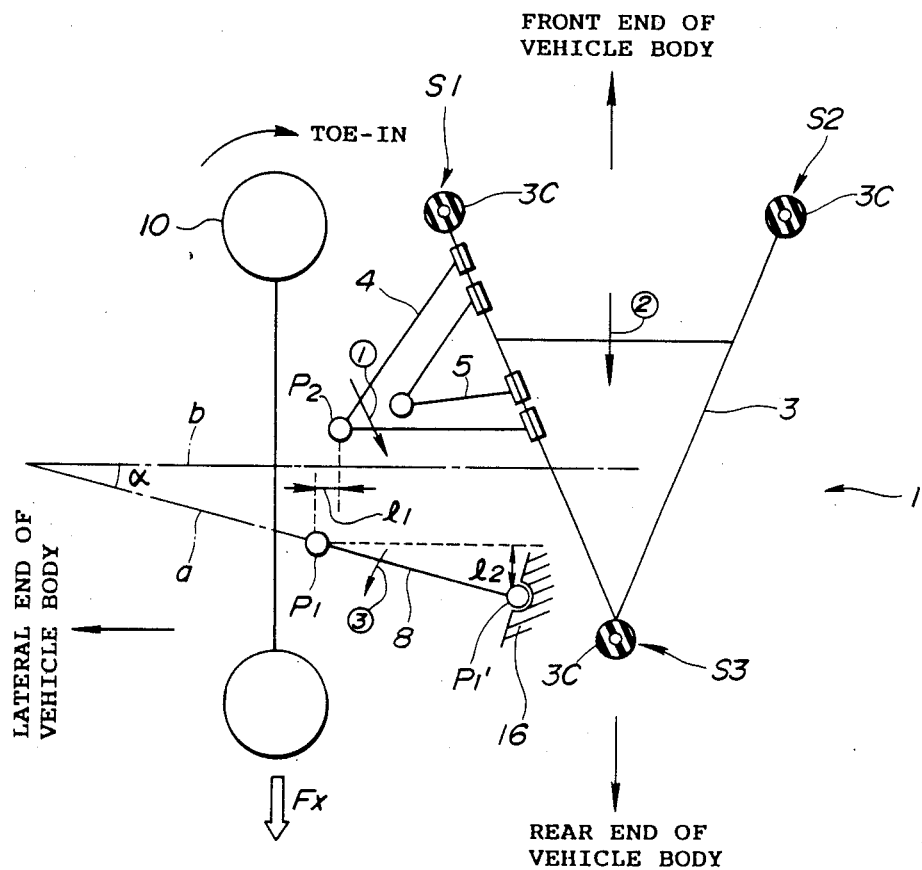
FIG. 5 is a schematic illustration corresponding to the top plan view of FIG. 2.

Referring to FIG. 5, the relative positions of the lower control arm 4 and lateral rod 8 under a standstill condition are set as follows. The lateral rod 8 is adapted to support at the outer end, i.e., at the point P1 the rear wheel 10. The lower arm 4 is adapted to support at the outer pivot end, i.e., at the point P2 the rear wheel 10. The rear wheel supporting point P1 of the lateral rod 8 is arranged more laterally outward of the vehicle body by the distance $l_1$ than the rear wheel supporting point P2 of the lower control arm 4. Further, the point P1 of the lateral rod 8 is arranged more forward of the vehicle body by the distance $l_2$ than the point P1' at which the lateral rod 8 is supported on the vehicle body 16. That is, the extension "a" of the axis of the lateral rod 8 and a transverse axis "b" of the vehicle body 16 form a predetermined angle $\alpha$ depending on the above described distance $l_2$. The angle $\alpha$ which is determined depending on the distance $l_2$ is set to an optimal value which can be found through experiments.

The operation will now be described.

Upon rapid acceleration or deceleration, the rear wheels 10 are subjected to longitudinal forces. For example, as shown in FIG. 5, the rear wheel 10 may be subjected to a force Fx directed rearwardly of the vehicle body 16 as indicated by the arrow. When this is the case, the rear wheel 10 tends to move in the direction "Fx". In response to this movement of the rear wheel 10, the lower control arm 4 and upper control arm 5 move in the direction of the pivot axis (in the direction ① in FIG. 5), thus causing the point P2 of the low arm 4 to displace laterally inward of the vehicle body 16. Further, the suspension member 3 displaces a little rearward of the vehicle body 16 (i.e., in the direction ② in FIG. 5) while causing the bushings 3c at S1, S2, S3 to deform resiliently. In this instance, the lateral rod 8 swings or turns anticlockwise about the point P1' (indicated by ③ in FIG. 5). That is, since the axis of the lateral rod 8 and the transverse axis "b" of the vehicle body 16 is adapted to form an angle under a standstill condition, the point P1 displaces laterally outward of the vehicle body 16 when the angle $\alpha$ reduces in response the application of the force Fx to the rear wheel 10. The rearward movement of the rear wheel 10 thus causes outward movement of the point P1 and inward movement of the point P2. As a result, when the rear wheel 10 is subjected to the longitudinal force Fx, the point P2 turns about the point P1 laterally inward of the vehicle body, for example, in case of a left-hand rear wheel the wheel turns clockwise and in case of a right-hand rear wheel the wheel turns anticlockwise, thus allowing the rear wheels to be steered in the toe-in direction and thereby making it possible to maintain a good running stability of a vehicle even upon rapid acceleration or deceleration. The rear suspension system 1 is thus desriable from the safety driving point of view.

The rear suspension system 1 is suited for use in a car such as a one-box car which is desired to have a fully flat rear floor. In this connection, the leaf spring 9 makes it possible to considerably reduce the overall height of the rear suspension system 1 as compared with the comprable prior art rear suspension system in which coil springs are utilized since when coil springs are utilized together with struts the spring supports which are so-called strut towers need to be arranged high above the ground and therefore inevitably increase the overall hight of the suspension system. In this connection, the shock absorber 7 can be arranged to incline desiredly so long as the shock absorber 7 can function properly.

Figure 4:
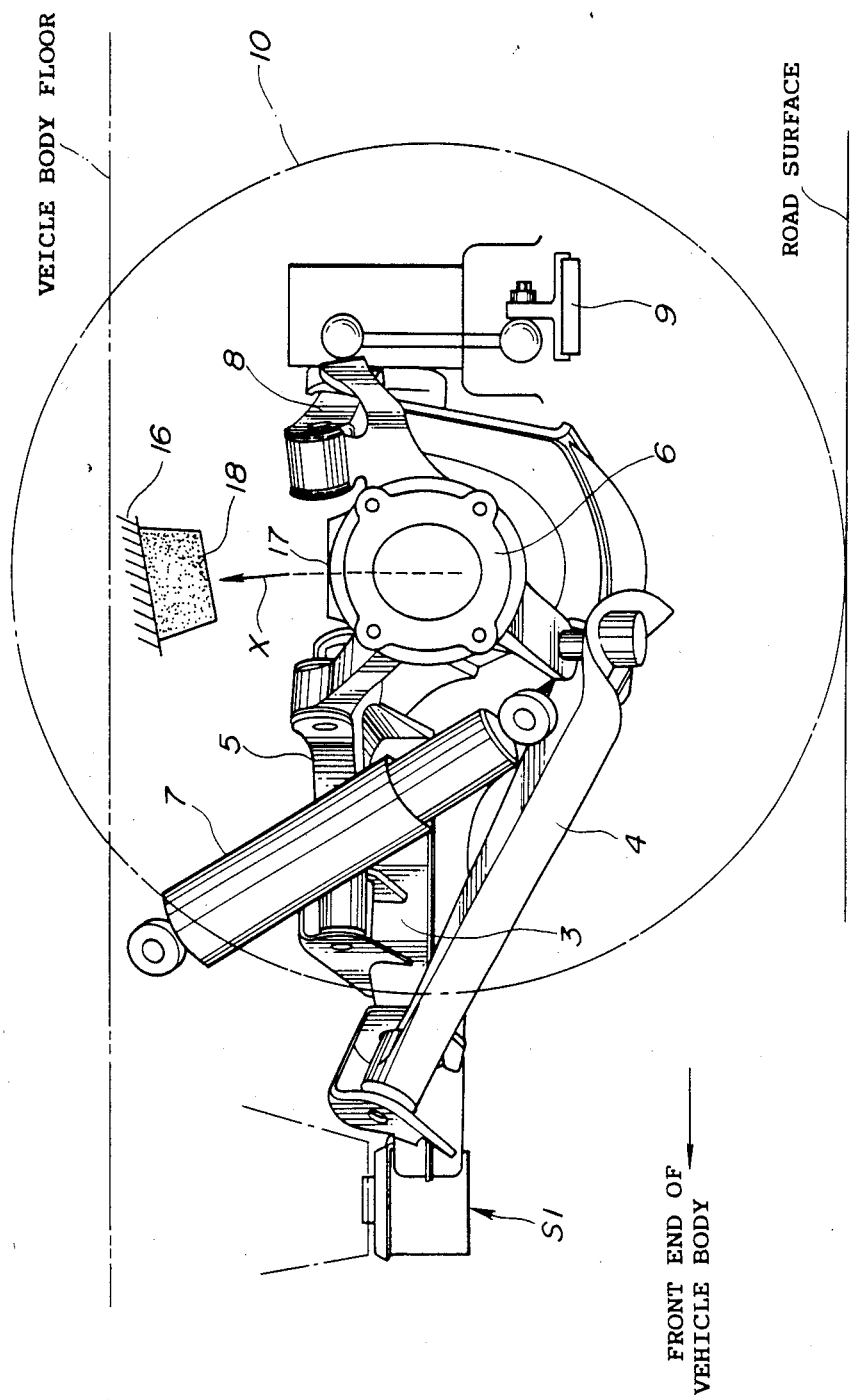
FIG. 4 is a side elevational view of the left-hand half of the rear suspension system of FIG. 2.

As shown in FIG. 4, the axle housing 6 is formed with an abutment 17 for abutting upon a bumper rubber 18 when the leaf spring 9 deflects a predetermined value. That is, the bumper rubber 18 is attached to the vehicle body 16 so as to be positioned in the way "X" of upward movement of the axle housing 6. The abutment 18 is formed integral with the axle housing 6. By this, it becomes possible to reduce the unsprung weight as compared with the structure in which an abutment 17 is independently produced and installed, and further it becomes possible to redcue the cost and the number of constituent parts.

What is claimed is:

1. A rear suspension system comprising:
an A-shaped control arm for supporting a rear wheel at a first point;
a lateral rod supporting the rear wheel at a second point and supported on a vehicle body at a third point;
said control arm and said lateral rod being constructed and arranged so that said second point is located more laterally outward of the vehicle body than said first point and that said second point is located more forward of the vehicle body than said third point.

2. A rear suspension system comprising:
an A-shaped control arm supported on a vehicle body in such a way as to be capable of pivoting about an axis and movable a little in the direction of said axis of pivoting and supporting a rear wheel at a first point; and
a lateral rod supporting the rear wheel at a second point and supported on the vehicle body at a third point;
said control arm and said lateral rod being constructed and arranged so that said axis of pivotting of said control arm goes laterally inward of the vehicle body as it extends rearward of the vehicle body, that said second point is located more laterally outward of the vehicle body than said first point, and that said second point is located more forward of the vehicle body than said third point.

3. The rear suspension system as set forth in claim 1, wherein said control arm has said first point at an outward pivot end and is pivotally supported on the vehicle body at inner separated pivot ends which have axes of pivoting coincident with said axis of pivoting of said control arm.

4. The rear suspension system as set forth in claim 3, further comprising a suspension member by way of which said control arm is supported on the vehicle body, said suspension member being resiliently supported on the vehicle body.

5. The rear suspension system as set forth in claim 4, where in said supension member is nearly A-shaped and has a pair of frame sections having a common rear end and separated front ends, said suspension member being supported on the vehicle body at said rear and front ends by way of resilient bushings.

6. The rear suspension system as set forth in claim 5, wherein said control arm is supported at the inner pivot ends on corresponding one of said frame sections of said suspension member.

7. The rear suspension system as set forth in claim 6, further comprising an axle housing which is pivotally connected to said outer pivot end of said control arm and which carries thereon the rear wheel.

8. The rear suspension system as set forth in claim 7, wherein said control arm is a lower control arm.

9. The rear suspension system as set forth in claim 8, further comprising a V-shaped upper control arm having an outer end pivotally connected to said axle housing and separated inner ends pivotally connected to said one frame section of said suspension member, said inner pivot ends of said upper control arm each having an axis of pivoting which coincides with that of said inner pivot ends of said upper control arm when viewed in a plan view.

10. The rear suspension system as set forth in claim 7, futher comprising a leaf spring arranged transversely of the vehicle body so as to support the rear wheel at each end of the leaf spring, said leaf spring being supported at a central portion on said suspension member.

11. The rear suspension system as set forth in claim 10, wherein said leaf spring is arranged so as to be offset away from an axis of rotation of the rear wheels rearward of the vehicle body by a predetermined distance.

12. The rear suspension system as set forth in claim 11, further comprising a bumper rubber attached to the vehicle body, said axle housing having an integral abutment for abutment with said bumper rubber when said leaf spring deflects a predetermined value.

* * * * *